Sept. 16, 1958        F. BAUER        2,851,725
DEVICE FOR THE MOULDING OF PLASTIC MATERIALS
Filed Nov. 2, 1956        2 Sheets-Sheet 1
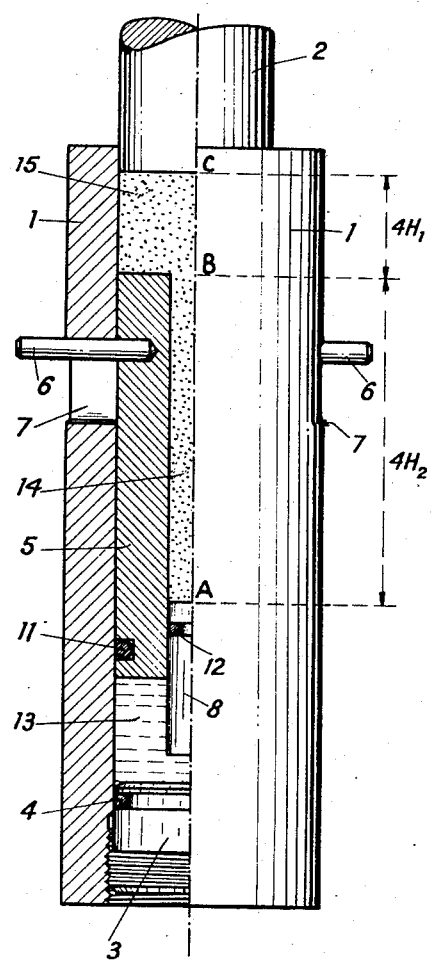
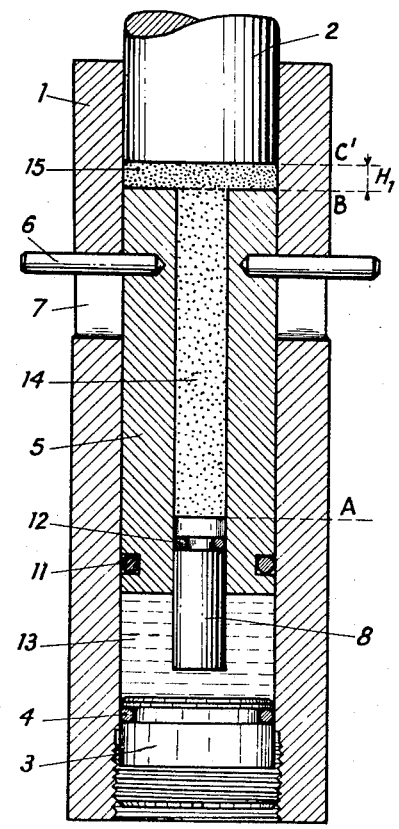
INVENTOR
FRANZ BAUER
By Young, Emery & Thompson
ATTYS.

Sept. 16, 1958    F. BAUER    2,851,725
DEVICE FOR THE MOULDING OF PLASTIC MATERIALS
Filed Nov. 2, 1956    2 Sheets-Sheet 2

INVENTOR
FRANZ BAUER

United States Patent Office 2,851,725
Patented Sept. 16, 1958

2,851,725

DEVICE FOR THE MOULDING OF PLASTIC MATERIALS

Franz Bauer, Choisy-le-Roi, France, assignor to Jean Gachot, Enghein (Seine et Oise), France Application November 2, 1956, Serial No. 620,114

Claims priority, application France June 29, 1956

6 Claims. (Cl. 18—5)

This invention relates to a device permitting the molding of plastic materials such as polytetrafluorethylene which are initially in a powdered condition and which may be cold shaped or hot shaped under the action of compressions ranging, for instance, from 150 to 1,000 kg. per square centimeter.

Compression molding is generally accompanied by a very substantial reduction of the apparent volume of the powder (which may decrease from 4 to 1). Serious difficulties result when trying to mold parts made up of sections of different dimensions. In such cases, the pistons which apply to the compression must have different lengths of stroke in order that the compression rate of the part remains uniform, which leads to complicated and costly molding presses.

This invention obviates these drawbacks and concerns a molding machine having a simple structure and allowing, however, the molding of very varied parts.

The machine according to the invention is chiefly characterized in that it comprises a lining provided with a driving piston and containing at least two sliding bodies capable of moving with respect to each other, and a constant volume of a non-compressible liquid in contact with said sliding bodies, the material to be molded being housed in the space left free inside the casing before putting in action the driving piston.

In a preferred embodiment of the invention, intended for the molding of prismatic or cylindrical articles, constituted substantially by two portions of different widths, the lining of the molding machine according to the invention receives a sliding sleeve inside which is housed a floating piston, the non-compressible liquid being held between the above mentioned lining, sleeve and piston, the inner cross sections of the lining and sleeve corresponding respectively to the main cross sections of the part to be molded.

Other features of the invention will also appear from the following description:

In the annexed drawings, given by way of non-limitative examples,

Figure 1 is an elevation with an axial semi-section of a machine for the molding of a part having a T section.

Figure 2 is an axial section of the machine of Figure 1 during molding.

Figure 3:
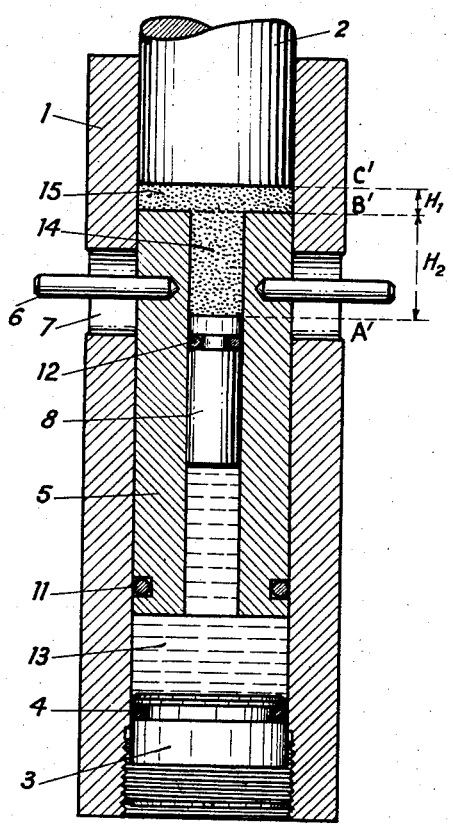
Figure 3 shows in the same conditions the machine at the end of the molding.

The machine of Figures 1 to 3 is intended for the molding of prismatic or cylindrical parts of polytetrafluorethylene with a T-shaped section.

This machine comprises a casing 1 the inner section of which corresponds to that of the cap of the part to be molded. This casing provided, at one end, with a driving piston 2 capable of exerting a pressure of 300 kg./cm.² for instance.

At the other end, the casing 1 comprises an adjustable threaded plug 3 provided with a sealing gasket 4.

Inside the casing 1 are housed a sleeve 5, provided with operating grips 6 which protrude through apertures 7 of the casing 1 and a floating piston 8. The inner section of the sleeve 5 corresponds to that of the body of the part to be molded. The members 5 and 8 which are provided with sealing gaskets 11 and 12 limit, with the casing 1 and plug 3 a certain volume, entirely filled with a non-compressible liquid 13 such as water.

The operation of the machine is as follows:

If $H_1$ and $H_2$ are the respective heights of the cap and body of the part to be molded, the assembly is arranged according to Figure 1 in such a manner that $AB=4H_2$. To that effect, the sleeve 5 being lifted by a maximum amount by means of the grips 6, the piston 8 is placed at the desired level by adjusting the position of the threaded plug 3.

One then fills with polytetrafluorethylene in a powder form, the spaces 14 and 15 left free inside the casing 1, the height BC of the space 15 being substantially equal to $4H_1$.

Then the piston 2 is lowered. During the first phase of the motion, this piston compresses the powder contained inside the space 15, the distance BC becoming $BC'=H_1$ (Figure 2). The piston 2 continuing its motion causes the sleeve 5 to move downwardly which causes the floating piston 12 to move upwardly, inside the latter due to the transmission of pressure ensured by the liquid 13.

The pressure exerted by the piston 8 on the powder contained in the chamber 14 is equal to 300 kg./cm.². The piston 8 continues its motion until the powder of the space 14 is compressed at the same rate as that of space 15. At that time $A'B'=H_2$.

To remove the part obtained from the mold, it is sufficient, after having removed the piston 2 to lower the sleeve 5 by means of the grips 6. A new upward motion of the piston 8 ejects the molded part.

The machine according to the invention, therefore, is easily realized, and is capable of a rapid operation. It allows molding of any prismatic or cylindrical part comprising portions of different widths. These parts may or may not comprise an axis or plane of symmetry. Their inner core may be hollow or eccentrical. It is possible, thus, to manufacture plugs, gaskets, connections capable of being machined later, electronic tube sockets, etc.

In all cases these parts may be manufactured by suitably fitting the sliding bodies inside the casing 1.

Figure 4:
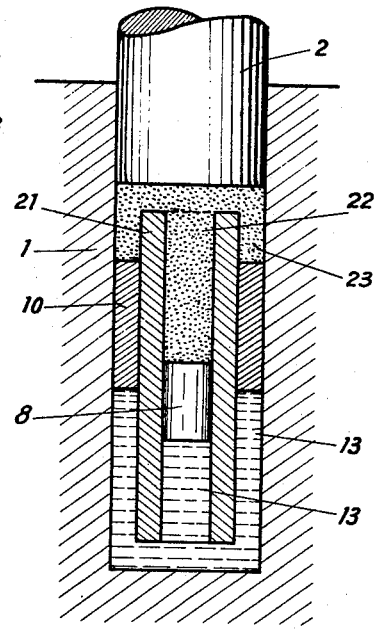
Figure 4 shows, in axial section, a machine for the molding of another part.

In the example of Figure 4 there is represented, at the end of the molding, a machine with two coaxial sleeves 10 and 21, and a central floating piston 8. It is possible also to produce parts 22, the head of which comprises a peripheral collar 23. During molding, the sleeve 21 moves first and causes the upward movement, successively of the sleeve 10 and piston 8.

Figure 5:
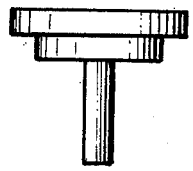
Figure 5 shows, in elevation, a part which is also capable of being molded by a machine according to the invention.

With a system having three sliding bodies, it is possible also to mold parts having the profile shown in Figure 5.

It is obvious that the invention is not limited to the embodiments described, and that any modifications may be made thereto.

Thus the cross sections of the pistons and sleeves in contact with the powder to be molded may comprise recessed or protruding portions.

I claim:

1. A machine for the compression molding of powdered plastic material, said machine comprising a casing, a driving piston movable in said casing, at least two sliding bodies capable of moving with respect to each other located in said casing, two deformable volumes provided within said casing and separated by said sliding bodies, one of said volumes, limitable by said driving piston, being intended for receiving the material to be molded, the other one of said volumes containing a non-compressible liquid in contact with said sliding bodies.

2. A machine for the compression molding of powdered plastic material, said machine comprising a tubular casing having two ends, with one of said ends being open and the other one closed, a driving piston engageable within said open end for movement inside said casing, a sliding sleeve housed within said casing and a floating piston housed inside said sleeve, two deformable volumes provided within said casing and separated by said sliding sleeve and floating piston, one of said volumes, limitable by said driving piston, being intended for receiving the material to be molded, the other one of said volumes containing a constant mass of a non-compressible liquid in contact with said closed end of said casing and said sliding sleeve and floating piston.

3. A machine for the compression molding of powdered plastic material into cylindrical bodies having two portions of different widths, said machine comprising a tubular casing having two ends, with one of said ends being open and the other one closed, a driving piston engageable within said open end and movable inside said casing, two sliding bodies capable of moving with respect to each other located in said casing, one of said bodies consisting in a sliding sleeve and the other one in a floating piston housed inside said sleeve, with the inner cross sections of said casing and sliding sleeve corresponding respectively to the main cross sections of the two portions of the cylindrical bodies to be molded, a free space intended for receiving said powdered plastic material left within said casing, said open end, sliding sleeve and floating piston and a constant volume of a non-compressible liquid housed within said casing, oppositely to said driving piston relating to said sliding bodies, said liquid being in contact with said closed end of said casing and said sliding sleeve and floating piston.

4. A machine for the compression molding of powdered plastic material, said machine comprising a tubular casing, longitudinal apertures in said casing, said casing having two ends, with one of said ends being open and the other one closed, a driving piston engageable within said open end for movement inside said casing, a sliding sleeve housed within said casing, means to displace said sleeve from the outside relating to said casing, said means comprising operating members fitted on said sleeve and projecting through said longitudinal apertures, a floating piston housed inside said sliding sleeve, two deformable volumes provided within said lining and separated by said sliding sleeve and floating piston, one of said volumes, limitable by said driving piston, being intended for receiving the material to be molded, the other one of said volumes containing a constant mass of a non-compressible liquid in contact with said closed end of said casing and said sliding sleeve and floating piston.

5. A machine for the compression molding of powdered plastic material, said machine comprising a tubular casing having two ends, with one of said ends being open and the other one comprising an adjustable threaded plug fitted in said lining, a driving piston, engageable within said open end for movement inside said casing, a sliding sleeve housed within said casing and a floating piston housed inside said sleeve, two deformable volumes provided within said casing and separated by said sliding sleeve and floating piston, one of said volumes limitable by said driving piston being intended for receiving the material to be molded, the other one of said volumes containing a constant mass of a non-compressible liquid in contact with said adjustable threaded plug, said sliding sleeve and floating piston.

6. A machine for the compression molding of powdered plastic material into cylindrical bodies having stepped profiles, said machine comprising a casing, a driving piston movable in said casing, two coaxial sliding sleeves of different diameters housed in said casing and capable of moving with respect to each other, and a floating piston, said piston being located within said sliding sleeve of smaller diameter, two deformable volumes provided within said casing and separated by said sliding sleeves and floating piston, one of said volumes, limitable by said driving piston, being intended for receiving the material to be molded, the other one of said volumes containing a constant mass of a non-compressible liquid in contact with sliding sleeves and floating piston.

References Cited in the file of this patent

UNITED STATES PATENTS

| 191,533 | Kent | June 5, 1877 |
| 1,679,408 | Davis et al. | Aug. 7, 1928 |
| 2,209,404 | Lassman | July 30, 1940 |

FOREIGN PATENTS

| 571,473 | Great Britain | Aug. 27, 1945 |